United States Patent [19]
Johnson

[11] 4,055,955
[45] Nov. 1, 1977

[54] MEMORY ALLOY HEAT ENGINE AND METHOD OF OPERATION

[76] Inventor: Alfred Davis Johnson, 2108 41st Ave., Oakland, Calif. 94601

[21] Appl. No.: 714,344

[22] Filed: Aug. 16, 1976

[51] Int. Cl.² .............................................. F03G 7/06
[52] U.S. Cl. ................................................... 60/527
[58] Field of Search ........................ 60/527, 528, 529

[56] References Cited
U.S. PATENT DOCUMENTS

| 3,303,642 | 2/1967 | Lee | 60/527 X |
|---|---|---|---|
| 3,316,415 | 4/1967 | Taylor | 60/529 X |
| 3,937,019 | 2/1976 | Renner | 60/527 |

*Primary Examiner*—Allen M. Ostrager
*Attorney, Agent, or Firm*—Flehr, Hohbach, Test

[57] ABSTRACT

A heat engine and method of operation employing an alloy having a shape memory effect. A memory alloy element such as one or more wire loops are cyclically moved through a heat source, along a path toward a heat sink, through the heat sink and then along another path in counter-flow heat exchange relationship with the wire in the first path. The portion of the wire along the first path is caused to elongate to its trained length under minimum tension as it is cooled. The portion of the wire along the second path is caused to contract under maximum tension as it is heated. The resultant tension differential between the wires in the two paths is applied as a force through a distance to produce mechanical work. In one embodiment a first set of endless memory alloy wires are reeved in non-slip engagement between a pair of pulleys which are mounted for conjoint rotation within respective hot and cold reservoirs. Another set of endless memory alloy wires are reeved in non-slip engagement about another pair of pulleys which are mounted in the respective hot and cold reservoirs. The pulleys in the cold reservoir are of a larger diameter than those in the hot reservoir and the opposite reaches of the wires between the two sets of pulleys extend in closely spaced-apart relationship in counter-flow heat regenerator zones. The pulleys are turned to move the two sets of wires in opposite directions. The wires are stretched as they are cooled upon movement through the heat regenerator toward the cold reservoirs, and the wires contract as they are heated upon movement through the regenerator zones toward the hot reservoir. This contraction of wires exerts a larger torque on the greater diameter pulleys for turning the pulleys and supplying mechanical power. Means is provided for applying a variable tension to the wires. Phase change means is provided for controlling the angular phase of the pulleys of each set for purposes of start up procedure as well as for optimizing engine operation under varying conditions of load, speed and temperatures.

25 Claims, 12 Drawing Figures

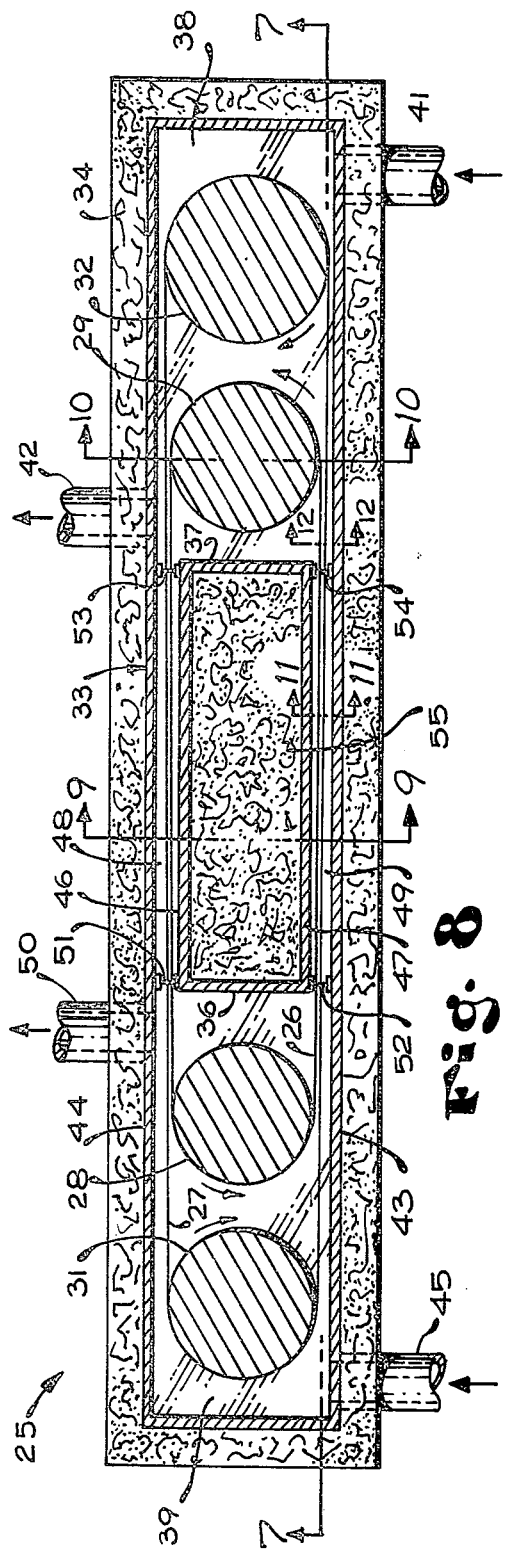
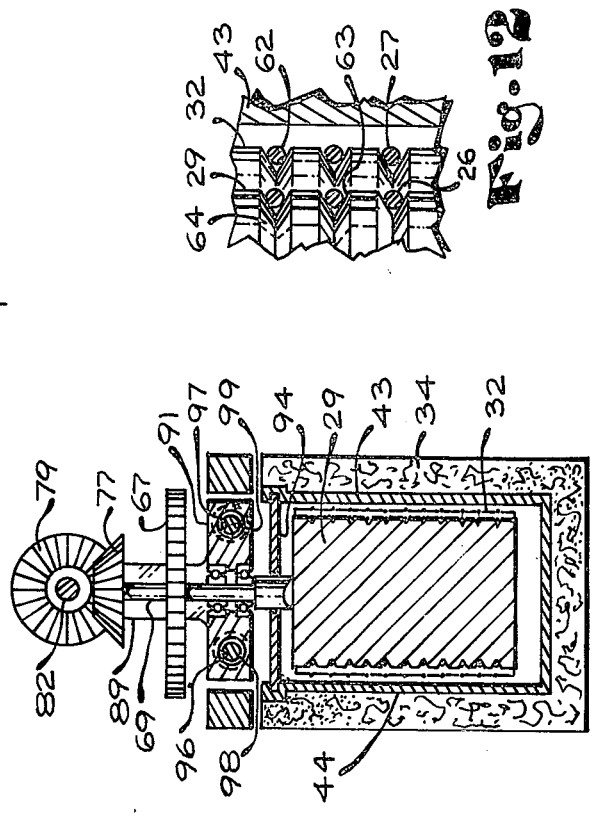
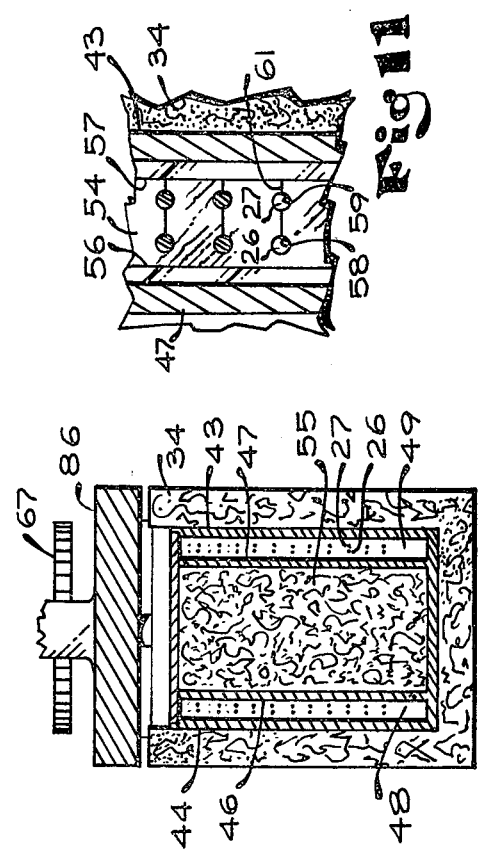

MEMORY ALLOY HEAT ENGINE AND METHOD OF OPERATION

BACKGROUND OF THE INVENTION

Within the past years heat engines have been developed which utilize the extraordinary properties of a nickel-titanium alloy called Nitinol to convert heat to mechanical energy. There exists the possibility that these small prototype solid-state engines may evolve into practical converters of waste heat.

The engines of the foregoing type are made possible by the discovery, in about 1960, of some remarkable properties possessed by nearly equi-atomic alloys of nickel and titanium. These alloys undergo an energetic crystalline phase change at ambient temperatures giving them a shape memory. The material if plastically deformed while cool will return to its undeformed shape when warmed, exerting great force as it does. This shape memory, energized by a solid-state phase change, has been utilized in several engine designs. Nitinol engines constructed prior to this invention are severely limited in thermodynamic efficiency; in these engines, cold Nitinol elements are heated by immersion in a hot fluid and these heated elements cooled in a heat sink at a much lower temperature. Such a cycle is irreversible because of the large amount of entropy generated, and consequently such engines cannot approach the efficiency of an ideal engine, or Carnot efficiency, $$\epsilon_c = \left( \frac{\text{work output}}{\text{heat input}} \right) \max = \frac{T_1 - T_2}{T_1}$$

where $T_1$ and $T_2$ are the absolute temperatures of the hot and cold baths. An engine incorporating a heat regenerator overcomes this difficulty and can, in principle, be made to operate near Carnot efficiency.

OBJECTS AND SUMMARY OF THE INVENTION

It is a general object of the invention to provide a new and improved heat engine employing an alloy with a shape memory effect, and the method of operation thereof for converting thermal energy to mechanical energy with high efficiency.

Another object is to provide method and apparatus of the character described which employs wires of a memory alloy such as Nitinol mounted in loops between conjointly rotating pulleys carried in a respective heat sink and heat source.

Another object is to provide method and apparatus of the character described in which the shape memory alloy is moved in heat exchange relationship in a heat regeneration zone during travel to and from the heat sink and heat source for significantly increasing thermodynamic efficiency.

Another object is to provide method and apparatus of the character described which provides means for changing the angular phase relationship of the pulleys for a start up procedure, and also for optimizing engine operation during running as conditions such as load, temperature and speeds change.

Another object is to provide method and apparatus of the character described which includes seal means for preventing fluids in the heat sink and heat source from being carried with the wires into the heat regeneration zones.

The invention in summary includes an engine incorporating a working element formed of an alloy having a shape memory effect. In one embodiment the shape memory element comprises a wire formed in an endless loop reeved in non-slip engagement about a pair of small and large diameter pulleys which are rotatably mounted in a respective heat source and heat sink. The two reaches of the wires between the pulleys are mounted for movement in heat exchange relationship. The pulleys are constrained for conjoint rotation so that the portion of the wire which is cooled as it moves toward the heat sink is stretched toward its trained length, and thereafter the wire portion contracts to its memory shape as it is heated during movement toward the heat source. The differential in tension between the two reaches of the wires exerts a resultant torque on the larger diameter pulley to produce power output. In another embodiment two sets of wires are mounted between inner and outer sets of pulleys which in turn are rotatably mounted in a heat sink and a heat source. The pulleys which are in the heat sink are of a larger diameter than the pulleys in the heat source. The pulleys are constrained for rotation in a manner which carries the wires on the inner pulleys in counterflow heat exchange relationship with the wires on the outer pulleys. An adjacent pair of pulleys are mounted on a carriage for movement relative to the opposite set for selectively varying tension in the wires. The drive train which rotatably couples the pulleys includes a differential gear mechanism for selectively shifting the angular phase relationship between the pulleys for purposes of start up procedure and for optimizing engine operation as conditions such as load, speed and temperatures vary.

The foregoing and additional objects and features of the invention will appear from the following description in which the preferred embodiments have been set forth in detail in conjunction with the drawings.

BRIEF DESCRIPTION OF THE DRAWINGS

FIG. 8 is a horizontal sectional view taken along the line 8—8 of FIG. 7.

FIG. 9 is a cross-sectional view taken along the line 9—9 of FIG. 8.

FIG. 10 is a cross-sectional view taken along the line 10—10 of FIG. 8.

FIG. 11 is a fragmentary cross-sectional view taken along the line 11—11 of FIG. 8.

FIG. 12 is a fragmentary cross-sectional view taken along the line 12—12 of FIG. 8.

DESCRIPTION OF THE PREFERRED EMBODIMENTS

In Nitinol engines, the phase change is from one form of solid to another form of solid. The precise change is not at present completely understood, but the high-temperature phase is a body-centered cubic (CsCl) crystal, while the low-temperature phase is more complex but is probably basically ortho-rhombic. In this state, deformation takes place with little energy loss by migration of micro-twinning boundaries within individual crystals. Since no atomic bonds are severed in this process, it is reversible. Heating the crystal above its transition temperature causes the formation of the CsCl structure, and the atoms attempt to recover their original positions. This seems to explain the "shape memory" illustrated in the above simple engine. It does not explain that Nitinol can also be "trained" so that its shape when cold is different from its shape when hot even in the absence of external forces. The ability to be trained constitutes a useful feature in improving the efficiency of such an engine.

Figure 1:
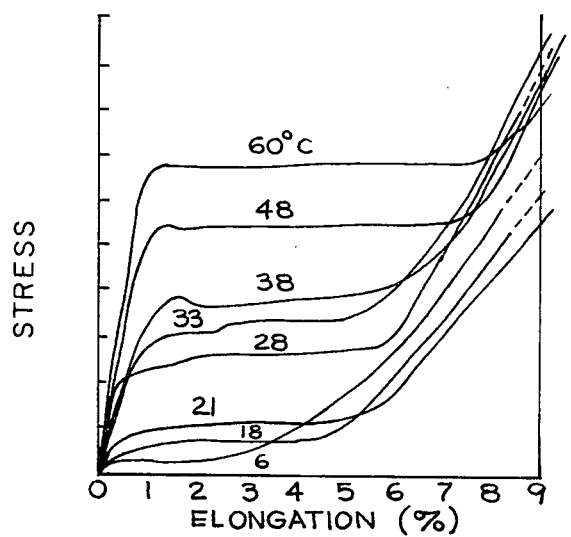
FIG. 1 is a graph depicting a family of curves showing stress as a function of strain for an untrained Nitinol wire held at a series of fixed temperatures.
Figure 2:
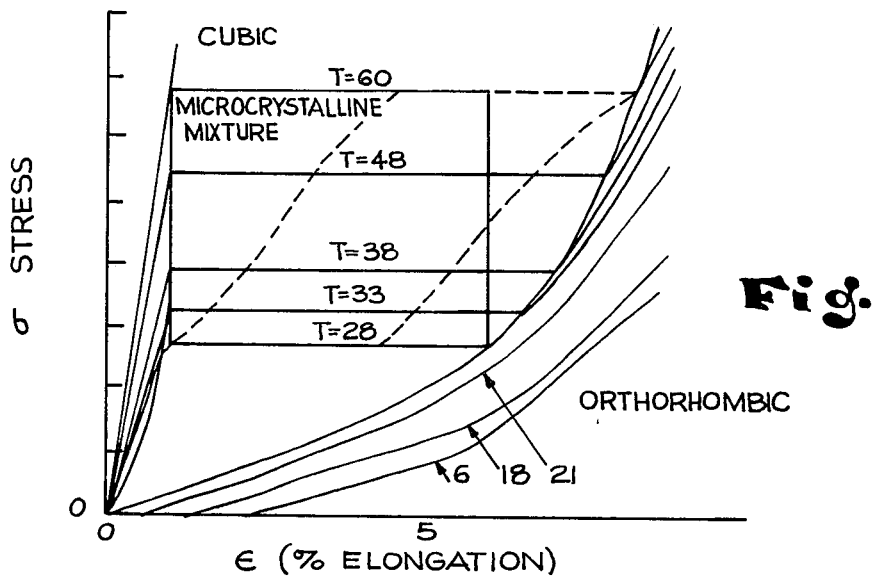
FIG. 2 is a graph depicting an idealized stress-strain relationship for Nitinol illustrated as a phase diagram for the alloy.

The amount of work which may be done per cycle and the theoretical efficiency may be estimated from stress-strain data. FIG. 1 shows data from 0.5mm diameter wire taken from test results. Each line represents a test with an untrained wire at a given temperature. Notice that each isotherm has a plateau: at a given temperature, there is a particular stress at which the wire yields plastically until it reaches an elongation which may be as high as 8%, depending on the temperature, and then resumes a normal stress-strain behavior. In an engine cycle, the material is deformed along one of these isotherms, then heated and allowed to contract along another isotherm as shown in FIG. 2. Nitinol actually will traverse different isotherms on heating and cooling even without external forces. This "hysteresis" behavior will not be considered for the present discussion. In contracting, it will readily do as much as 7 × 10$^6$ Joules per cubic meter of material. From this and other experimental data it is estimated that, at a cycle rate of one Hertz, output from Nitinol engines should be as high as one watt per gram.

Figure 3:
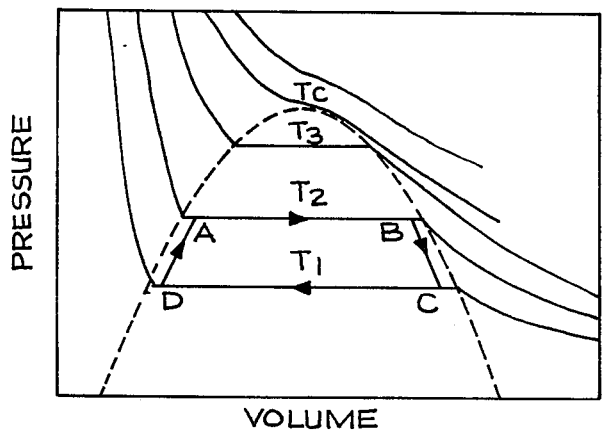
FIG. 3 is a graph depicting a family of curves for a pressure-volume phase for a fluid-gas system.

Insight into the behavior of Nitinol may be gained by analogy with a liquid-gas system. FIG. 3 is a phase diagram of such a system.

As the temperature decreases below $T_c$, the isotherms develop plateaus. As a plateau is traversed from left to right, that is, as the volume is increased, the liquid is transformed to a gas. On the plateau (or rather within the region enclosed by the dotted line) the system exists as a mixture of liquid and gas. A simple heat engine cycle consists of following a path such as ABCDA. Liquid boils at temperature $T_2$ (line AB) and does work at constant P. The gas is cooled (line BC) and compressed (line CD), then its temperature is again raised from $T_1$ to $T_2$ and the cycle repeated. From the enclosed area the net work output can be calculated.

Now consider the Nitinol engine cycle depicted in FIG. 2. Assume that the region to the upper left of the curves represents the hot (cubic) phase, that to the lower right the cold (orthorhombic) phase, and the region between, having isotherms with plateaus, is a mixture of the two phases. The rectangle outlined by arrows in this diagram is closely analogous to that in FIG. 3 for a gas. A major difference is that Nitinol is farther from being "ideal" than even a relatively nonideal gas. Still, it is possible to make some predictions based upon this model. By assuming temperatures $T_1 = 60°$ C, $T_2 = 28°$ C, a theoretical efficiency of 5% for such a cycle can be estimated.

From the model it is clear that the thermodynamic efficiency is a function of $\Delta T$. This point eluded some of the early critics of Nitinol engines who insisted that, since the temperature range over which the transition takes place under no-stress conditions is about 20° C, one could never hope for better Carnot efficiency than about 7%. By contrast, a Nitinol engine using hot and cold reservoirs near boiling and freezing temperatures has a Carnot efficiency near 25%:

$$\epsilon_c = \frac{T_1 - T_2}{T_1} \approx \frac{370 - 270}{370} \approx .25$$

In reality, no Nitinol engines in existence today approach these limits.

Assuming a cycle rate of one hertz, a rate of heat input of the order of 25 watts/gram is required to cause the transformation of Nitinol (latent heat) and an additional input of about 25 watts/gram (sensible heat) to raise the temperature from heat sink to heat source temperature. Neglecting losses, the efficiency of such a non-regenerative engine is therefore limited to approximately:

$$\frac{\text{one watt output/gram}}{50 \text{ watts input/gram}} \approx 2\%$$

Figure 4:
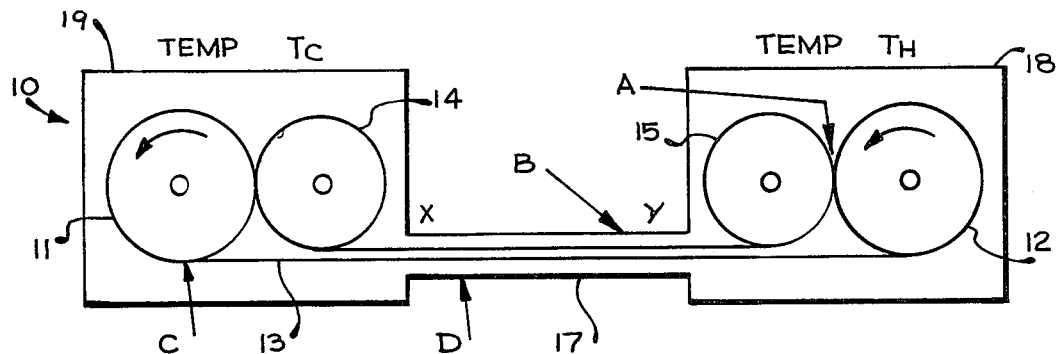
FIG. 4 is a schematic diagram of a shape memory heat engine incorporating one embodiment of the invention.

FIG. 4 illustrates schematically an engine 10 of the invention employing counter-flow heat exchange to recover a portion of the sensible and latent heats and thereby provide a significant increase in efficiency over the non-regenerative type of engine.

Engine 10 includes a pair of drive pulleys 11, 12 coupled mechanically, not shown, so that they rotate synchronously. An endless wire 13 formed of an alloy having a shape memory effect, herein referred to as "memory alloy", is trained in non-slipping engagement about the drive pulleys, and two idler wheels 14, 15 are mounted adjacent the pulleys to direct the opposite-moving reaches of the wires in close-spaced heat exchange relationship in a housing 17 which forms heat exchange region x-y containing a suitable heat exchange fluid such as water. A hot reservoir 18 provides a heat source at temperature $T_H$ about pulley 12, and a cold reservoir 19 provides a heat sink at temperature $T_c$ about pulley 11. The operation of engine 10 will be described as employing Nitinol as the memory alloy, although it is understood that other materials having the shape memory effect, such as CuAlNi alloy, could also be used.

Pulley 12 is a few percent smaller than pulley 11, so that the Nitinol wire is stretched in going from the hot end of the engine at right to the cold end at left. If the pulleys are rotating counterclockwise as shown, cold wire from pulley 11 travels from x to y and is heated in region x-y while hot wire from pulley 12 travels the opposite direction in close proximity to the cold wire and transfers a portion of its heat to the other reach of the wire. Under quasi-static conditions, the temperature difference between the two reaches of wire is minimized, and a maximum fraction of the sensible and latent heats are recovered. The heat exchanger need contain only enough working fluid to wet the two reaches of wire so that heat is transferred. This engine, with a heat source at one end and a heat sink at the other, could be utilized as a mobile engine. It has the interesting characteristic that it is symmetrical and will run in whichever direction it is started.

Figure 5:
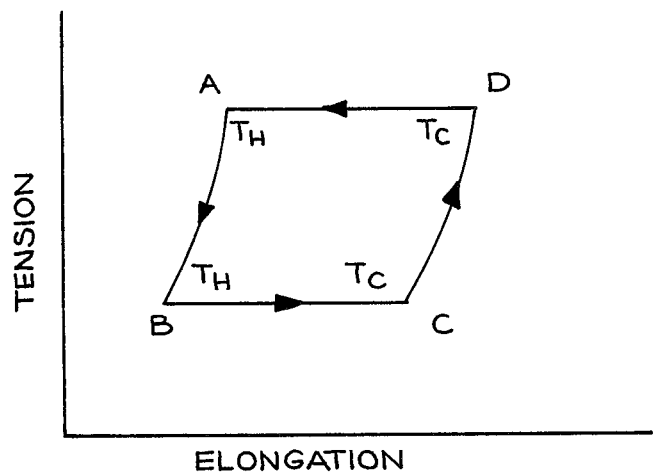
FIG. 5 is a graph depicting a theoretical stress-strain relationship for the engine of FIG. 4.

Although accurate thermodynamic data are lacking, it is informative to sketch the approximate cycle of this class of engines in thermodynamic variables. FIG. 4 represents the engine cycle in mechanical terms. FIG. 5 represents the engine in the form of stress versus strain or tension-elongation, and FIG. 6 in temperature versus entropy variables. In all three diagrams Points A, B, C, and D represent approximately the same point in the cycle. A point in one set of variables may correspond to a line in another. For example, point A represents the entire circumference of the pulley in FIG. 4 which is at the same temperature and tension. At point A (FIG. 4) the wire first loses contact with the hot pulley. It is at maximum tension and temperature before release, and undergoes a rapid change in tension. The wire is still in the hot bath. A sudden adiabatic contraction (during which the wire cools) is followed by an approach to thermal equilibrium at temperature $T_H$, ending where this isotherm intersects the lowered tension. Next, cooling at constant (minimum) tension occurs as the wire traverses the heat exchanger. It reaches a lower equilibrium temperature $T_c$ and is transported over the cold drive pulley to C.

During this part of the cycle the wire elongates for two reasons: it is cooled, and, being a trained wire, it automatically stretches to its trained length. It also is now more pliant than at point B, and stretches due to the tension.

As the wire loses contact with the cold pulley at C, it sees a sudden increase in tension. It reacts by stretching adiabatically with an increase in temperature. Heat is removed to bring it to equilibrium once more with the cold bath. It then follows an isotherm to point D. It is still cold, but now enters the heat exchanger and begins to be heated at constant (maximum) tension. Isotherms are crossed until the region of mixed phases is reached, and then it follows an isotherm to point A, completing the cycle as it passes over the hot pulley.

From this description it should be clear that it is essential to achieve sufficiently high and low temperatures if the engine is to operate. Compare FIG. 1 with FIG. 5. If the high temperature is less than $T_H$ contraction will cease when the horizontal line in FIG. 6 intersects the isotherm without traversing the plateau while under high tension. This loss in function does not have a gradual onset, but occurs at a critical temperature for a given elongation ration. Similarly, if $T_c$ is not sufficiently low, the isotherm for $T_c$ will be intersected near B, and, instead of a horizontal line BC in FIG. 5, a sloping line from B to D will result, which rapidly reduces the area enclosed within the curves.

Figure 6:
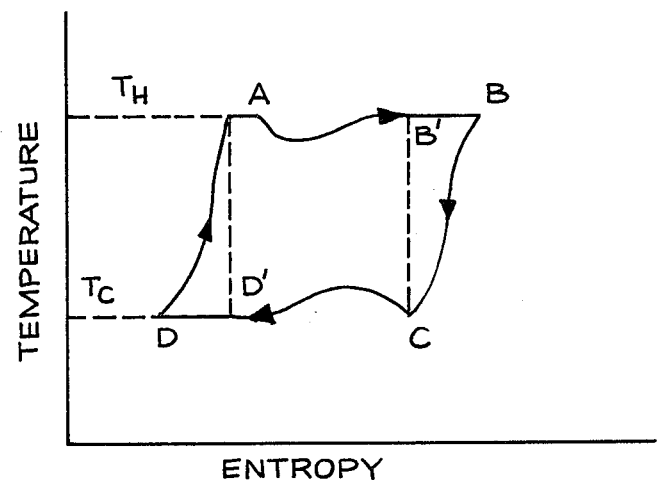
FIG. 6 is a graph depicting a temperature-entropy relationship for the engine of FIG. 4.
Figure 7:
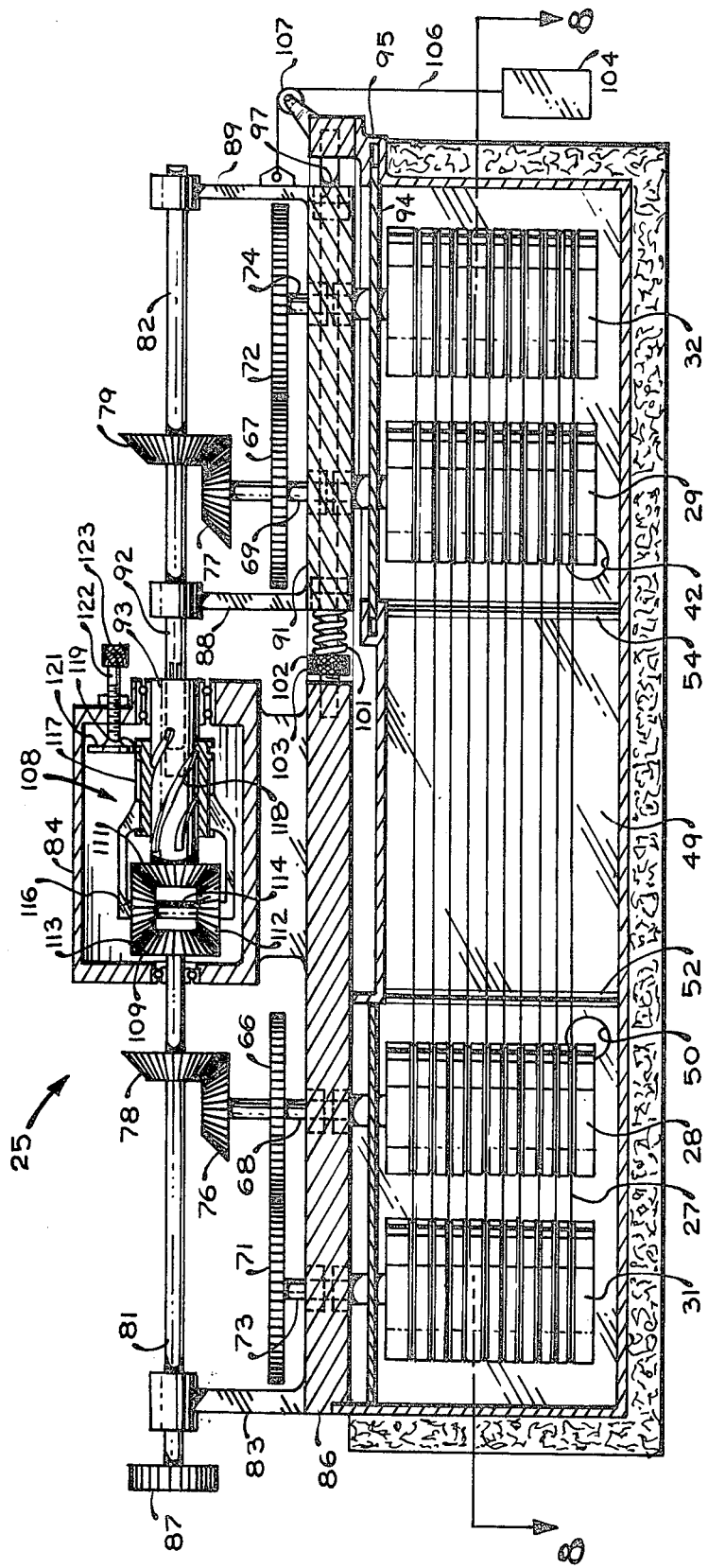
FIG. 7 is a longitudinal vertical sectional view of another embodiment of the invention taken along the lines 7—7 of FIG. 8.

Now we shall show how an efficiency may be calculated from a diagram such as FIG. 6. The advantage of entropy S as a variable is that S of a state is independent of the path taken to that point. The path through the heat exchanger (BC and DA) are neither at constant temperature nor at constant entropy. But each may be replaced by segments (BB' and DD') which are at constant temperature, followed by segments (B'C and D'A) at constant entropy. BB' (or DD') is an isothermal at high (low) temperature nearly retracing part of path AB (or CD). B'C is adiabatic, so that $\Delta S = 0$ along this path. From the definition of entropy $$\Delta S = \int \frac{dQ}{T}$$

it is possible to calculate $\Delta S$ for any segment of path along which T is constant and for which $\Delta Q$ is measured.

For purposes of analysis, assume that the lines AB and CD are horizontal in FIG. 6 (that is, the short adiabatic expansion and contraction are neglible) and that the distances BB' and DD' are made to approach zero. Then the amount of energy available to do work is $\Delta Q_{AB} - \Delta Q_{CD}$ while the total heat input is $\Delta Q_{AB}$. But $$\Delta Q_{AB} = \int_A^B TdS = T_H \Delta S$$

$$\Delta Q_{CD} = \int_C^D TdS = T_C \Delta S$$

So maximum Efficiency |

$$\epsilon_c = \frac{\Delta Q_{AB} - \Delta Q_{CD}}{\Delta Q_{AB}} = \frac{T_H \Delta S - T_C \Delta S}{T_H \Delta S}$$

which is the Carnot efficiency.

The system we have described is an approximation to this. If we take into account the segments BB' and DD', we may calculate a better approximate efficiency thus:

$$\epsilon \approx \frac{\text{energy available to do work}}{\text{heat energy input}} =$$

$$\frac{\left(\int_A^B T_H dS - \int_B^{B'} T_H dS\right) - \left(\int_C^D T_C dS - \int_\epsilon^{D'} T_C dS\right)}{\left(\int_A^B T_H dS - \int_B^{B'} T_H dS\right)}$$

$$= \frac{(\Delta Q_{AB} - \Delta Q_{BB'} - \Delta Q_{CD} - \Delta Q_{DD'})}{\Delta Q_{AB} - \Delta Q_{BB'}}$$

Note that it is necessary to measure the above $\Delta Q$'s in order to estimate an efficiency. This has never been done systematically. Using crude data which are available (and a somewhat more complicated argument) it has been estimated that such an engine may achieve up to 80% of Carnot efficiency.

We should also try to estimate the change in temperature associated with the adiabatic changes in tension at A and C. At A, the wire is hot (fully transformed) and therefore the only heat change will be due to normal quasi-elastic deformation, i.e. the heat coefficient is a normal $C_v$. The isotherm is very steep, so that only a minor change in elongation takes place here. Hence the temperature change should not be a significant part of $T_H - T_C$.

Conversely at C, the wire is completely in its cold state and therefore has a normal $C_v$. If the wire is a trained wire so that its elongation is "automatic" and if $T_C$ is sufficiently below the transition temperature range for the (minimal) tension, then the change in elongation in going from C to D should be a small part of the total, and again the temperature change should be small compared to $T_H - T_C$.

FIGS. 7-12 illustrate another embodiment of the invention comprising a memory alloy heat engine 25 employing a counter-flow heat regenerator system for converting thermal energy to mechanical power with significantly high efficiency. Engine 25 comprises multiple inner and outer memory alloy elements 26, 27 for increased power output and efficiency, and the particular number of such elements depends upon the specifications and requirements of the desired engine application. A plurality of the inner elements 26 are formed in endless wire loops, the opposite ends of which are reeved about a set of inner pulleys 28, 29. A plurality of the outer elements 27 are formed into endless wire loops of a longer length than the inner elements, and opposite ends of the outer loops are reeved around a set of outer pulleys 31, 32 which are mounted for rotation about axes parallel with and outside of the inner pulleys. Additional pulley sets could be provided as required. This embodiment will be described as employing Nitinol as the memory alloy, although other suitable memory alloys could be employed as previously described. Also, while a plurality of endless wire loops are disclosed, the invention contemplates that a continuous loop could be reeved about each pulley set in bands which angle between the pulleys in multiple passes.

The two sets of pulleys and wire loops are enclosed by a housing 33, illustrated as box-shaped. A suitable insulation layer 36 is disposed about the housing for minimizing energy loses by heat transfer. A pair of walls 36, 37 are mounted within the housing adjacent to the inner pulleys for defining at one end a reservoir or heat source 38 for containing a suitable heating medium, and at the other end a reservoir or heat sink 39 for containing a suitable coolant medium. Inlet and outlet conduits 41, 42 extend into opposite side walls 43, 44 of the housing for directing the heating medium into and out of the heat source, and inlet and outlet conduits 45, 50 extend into these walls for directing the coolant fluid into and out of the heat sink. The heating and coolant media preferably are suitable heat exchange fluids such as water or other liquids, a liquid and gas mixture or a mixture of fluids. Where the memory alloy is Nitinol the medium entering the heat source is heated by suitable means, not shown, to a temperature in the range of 70°–80° C, and the coolant medium entering the heat sink is cooled by suitable means, not shown, to a temperature in the range of 5°–10° C. Other means could be employed as the heat source, e.g. radiant energy, and it is understood that the invention is not limited to any particular heating or cooling means or temperature range.

A pair of walls 46, 47 are mounted in spaced-apart relationship from the side walls of housing 33 to define two heat regeneration chambers 48, 49 through which opposite reaches of the wires extend. Four seals 51–54 are mounted at the junctures between the regeneration chambers and heat sink and heat source for preventing escape of the heating and cooling media into the regeneration chambers while at the same time permitting movement of the wires through the seals with minimum friction. Suitable insulation material 55 is contained in the space between the chambers for minimizing heat transfer losses. In FIG. 11 the typical seal 54 is shown as comprising a transversely extending strip 54 mounted between a pair of holders 56, 57. Openings 58, 59 are formed in the strips of a diameter commensurate with the diameters of the wires 26, 27, and slits 61 are formed across adjacent pairs of the openings to permit insertion and removal of the strips onto the wires. The wires move in close-spaced wiping contact with the edges of of the openings as they enter and leave the heat source and heat sink. The seals strip off the heating and cooling fluids so that lateral flow of these fluids, and thereby fluid mixing, is reduced or eliminated for increased thermal efficiency. The invention contemplates that other seal means can be employed. For example the regeneration chambers 48 and 49 could be filled with a relatively high viscosity sealing fluid such as a jelly, or a plurality of flexible seals could be mounted at spaced intervals along the chambers, or a plurality of close-packed bristles could be provided along the path of the wires for stripping off the fluid. Preferably, a suitable heat exchange fluid is provided in each regeneration chamber for maximizing heat transfer between the inner and outer strands of wires.

The looped ends of the wires are reeved in non-slip engagement about the pulleys by means of axially spaced V-shaped grooves 62, 63 formed about each of the pulleys at the respective wire locations. As best illustrated in FIG. 12 the grooves or the typical pulleys 29 and 32 are formed with a relatively steep slope, preferably having an included angle on the order of 45°, to provide substantial frictional grip with the wires. In addition, the outer surfaces of the grooves are formed with a coating 64 of a suitable high friction material, e.g. a fibrous material, which provides additional frictional grip to prevent slippage on the pulleys which could otherwise occur due to the tension forces which are created as the wires stretch. The pulleys could also be formed entirely of such a high friction material.

Means is provided for constraining or synchronizing the inner set of pulleys for conjoint equal angular rotation in a given direction, and for constraining or synchronizing the outer set of pulleys for conjoint equal angular rotation in a direction opposite that of the inner pulleys so that the wires carried by the two pulley sets move in opposite directions. The constraining means shown in this embodiment comprises a gear train which includes a first pair of spur gears 66, 67 mounted on shafts 68, 69 for rotation with respective inner pulleys 28, 29, and a second pair of spur gears 71, 72 intermeshing with the first gears and mounted on shafts 73, 74 for rotation with outer pulleys 31, 32. A pair of bevel gears 76, 77 are keyed on axially aligned transverse shafts 81, 82. The shaft 81 is mounted at one end on a bearing carried in a support 83 and at its opposite end on a bearing in a differential gear housing 84. The support 83 and housing 84 are carried on a plate 86 which is mounted above housing 33. A drive gear 87 keyed on the end of shaft 81 is provided for delivering rotary output power to a suitable end use device, not shown. The opposite ends of shaft 82 are mounted in bearings carried on supports 88, 89 which in turn are mounted on a carriage 91 in which the pulley shafts 69, 74 are rotatably mounted. The inner end 92 of shaft 82 is rotatably connected by a spline with a large diameter shaft 93 which in turn is mounted by a bearing for rotation within gear housing 84.

The carriage 93 and thereby the pulleys and gears which it carries are mounted for lengthwise movement of the engine for purposes of selectively varying wire tension. A lower plate 94 is slidably mounted in slots 95 formed in housing 33, and the pulley shafts are mounted through openings formed in this plate. A pair of spaced bores 96, 97 are formed through the carriage, and the bores are mounted for sliding movement along a pair of rods 98, 99, the inner ends of which are mounted on plate 86 and the outer ends of which are mounted on the end of housing 33.

Means is provided for yieldably urging carriage 91 outwardly along the rods for varying wire tension, and in this embodiment such means comprises a compression spring 101 mounted about rod 97. The outer end of spring 101 bears against an adjusting nut 102 which is threaded on the rod and which can be turned for increasing or decreasing the spring force. A lock nut 103 is provided to lock the adjusting nut in the selected position. A weight 104 suspended by a wire 106 which is trained around a pulley 107 and attached to support 89 is provided for applying a predetermined constant tension force to the carriage and thereby to the Nitinol wires.

The drive shafts 81 and 82 are coupled for conjoint rotation by means of a differential gear mechanism 108 which includes means for selectively controlling the angular phase relationship between the shafts and thereby the angular phase relationship between the two pulleys in the heat source relative to the two pulleys in the heat sink. Differential mechanism 108 includes a bevel sun gear 109 mounted on the end of shaft 81 within housing 84 and an opposed bevel sun gear 111 mounted on the end of shaft 93. A pair of planetary gears 112, 113 are mounted on a shaft 114 and are in meshing engagement with the sun gears. The ends of the planet gears are carried on a spider 116, the inner end of which is mounted for axial sliding movement along splines formed about an adjusting collar 117. A series of cams, not shown, project radially inwardly from the collar into helical grooves 118 formed about shaft 93. A circular groove 119 is formed about the end of the collar and the lower edge of a disc 121 is positioned within this groove. The disc is mounted on an adjusting screw 122 which is threaded within the end of housing 84, and a hand knob 123 is mounted on the end of the shaft. The adjusting screw is turned in or out, as required, for axially moving collar 117 which is thereby rotated through an arc relative to shaft 93 as it follows the helical grooves. The collar in turn shifts the spider and thereby the planetary gears which act to rotate the outer sun gear through the same arc relative to the inner sun gear. The differential drive permits phase shifting to take place while the engine is running.

Suitable control means, such as a computer system, could be employed for controlling phase shifting so as to optimize engine performance, e.g. to optimize power output, thermodynamic efficiency, or a combination of these to maximize power per unit cost of energy input. The computer system would include means for changing the phasing as a function of changes in variables such as load, temperatures and speeds of the engine.

The invention also contemplates that other means could be employed for synchronizing rotation of the pulleys as well as effecting the phase shifting. For example, each pulley set could be mounted on a common shaft with the wires trained through a suitable idler pulley system. Phase shifting in such a system would be accomplished by means of selectively turning one pulley relative to the other on the shaft, such as by a helical spline arrangement.

The outer sets of pulleys 31, 32 are sized with diameters slightly larger than that of the inner pulleys to afford clearance of the outer wires over the inner wires. The wires should be as close as possible, and almost touching, so that heat transfer by convection and conduction is enhanced, but the wires should not be so close as to create frictional drag by contact. For example, for a 3.5 inch inner pulley an outer pulley diameter of 3.53 inches is suitable for this purpose. The axial spacing of the grooves on the pulley is also closely spaced to maximize heat transfer between the wires.

In each pulley set the pulleys disposed in the heat sink are of a larger diameter than the pulleys in the heat source. Preferably the diameters of pulleys 28 and 31 are substantially 3% larger than the diameters of the respective pulleys 29 and 32. As previously explained in connection with the embodiment of FIG. 4 this differential diameter creates a resultant torque acting on each of the larger pulleys as a result of the greater tension in the wire portions moving along the paths from the heat sink to the heat source. Thus, for engine 25 with the pulleys turning in the direction shown in FIG. 8 the reach of wires 27 at the upper end of the Figure are at a higher tension than the lower reach so that a clockwise resultant torque is applied to large diameter pulley 31. At the same time the lower reach of wires 26 on the inner pulleys are at a higher tension than the upper reach so that a counterclockwise resultant torque is applied to pulley 28.

The use and operation of the invention is as follows. A multiple wire counter-rotating heat engine is constructed in accordance with the embodiment of FIGS. 7–12. The endless wires are of Nitinol with a diameter in the range of .020 to .030 inch or smaller. The inner wires are reeved about cold end pulley 28 of 3.6 inch diameter and hot end pulley 32 of 3.53 inch diameter.

The start-up procedure for engine 25 is critical to prevent breakage of the Nitinol wires and also to obtain proper distribution of the mass of the wires about the pulleys for continuous operation. One start-up procedure which may be employed comprises the following steps. A heat exchange medium such as water within a temperature range of 70°–80° C is pumped through heat source 38 and a coolant medium such as water within a temperature range of 5°–10° C is pumped through heat sink 39. An external torque is applied, either manually or by a suitable drive motor, for turning the inside pulleys counterclockwise and the outside pulleys clockwise so that both sets of wires are cycled for a number of complete turns. Next the adjusting nut 102 is turned to compress spring 101 and slide the carriage 91 outwardly for gradually increasing tension on the wires while continuing to apply the external torque and cycle the wires. A steady state condition is then reached at which contraction of the wire moving from the cold end toward the hot end of each pulley set reaches a maximum tension. This tension is greater than the tension of the opposite wires so that a resultant torque is applied to the larger diameter pulleys. This torque is applied through the gear train and differential drive mechanism with a magnitude sufficient to continue driving the pulleys so that the external torque can be removed. Power in excess of that required to drive the pulleys is taken off spur gear 87.

Another start-up procedure which can be employed involves operation of differential drive mechanism 108 and comprises the following steps. The heat exchange and coolant media are pumped through the respective heat source and heat sink as previously described. Adjusting nut 102 is turned to move carriage 91 so that it applies tension forces on the Nitinol wires equal to that which will be applied when the engine is in a steady-state running condition. An external torque is then applied for turning the pulley sets in counter rotation as described above. At the same time screw 122 is turned, either manually or by suitable control means, so as to rotate spider 46 relative to shaft 93 and thereby vary the angular phase relationship between the hot end and cold end pulleys. The phase relationship is changed so that the wire tension remains constant as rotational speeds, loads and temperature distributions approach steady-state conditions. The external torque is removed when the output power developed by the Nitinol wires is sufficient to continue driving the pulleys.

Differential drive mechanism 108 is also employed for optimizing engine performance as operating conditions vary. Thus, after the engine is in operation should either the load increase or decrease, the heating and cooling temperatures increase or decrease, or the pulley speeds vary, adjusting screw 122 would be turned as required to vary the angular relationship so as to maintain the desired performance such as optimum power output, optimum thermodynamic efficiency, or maximum power per unit cost of energy input.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A method of converting thermal energy into mechanical work by means of a heat source, a heat sink, and a memory alloy which is characterized in having a transition temperature at which crystal phase transformation occurs, including the steps of cooling a portion of the alloy in the heat sink below said transition temperature whereby the cooled portion assumes a first configuration, moving the cooled portion along a first path from the heat sink to the heat source, heating a portion of the alloy in the heat source above said transition temperature whereby the heated portion assumes another configuration, causing the heated alloy portion to apply a force through a distance as it changes from the first to the second configuration to perform said mechanical work, and moving the heated portion of the alloy along another path in heat exchange relationship with the alloy portion in the first path whereby thermal energy from the heated portion is transferred to the cooled portion for maximizing the efficiency of conversion of thermal energy in the heat source into said mechanical work.

2. A method of converting thermal energy from a heat source into mechanical work by means of a memory alloy which when heated undergoes a phase transformation causing contraction thereof, and when cooled the alloy undergoes another phase transformation while undergoing elongation, including the steps of cyclically moving the alloy serially through a heat sink, along a first path extending from the heat sink to a heat source, through the heat source, and thereafter along a second path back to the heat sink in counter-flow heat exchange relationship with the alloy moving in the first path, heating the alloy in the heat source, cooling the alloy in the heat sink, transferring thermal energy from the heated alloy in the second path to the cooled alloy in the first path, permitting the alloy in the second path to elongate when it undergoes phase transformation as it is cooled, and causing the alloy in the first path to apply a force through a distance as it contracts during its phase transformation as it is heated to perform mechanical work.

3. A method as in claim 2 in which the memory alloy is formed in an endless loop having one end in the heat source reeved around a pulley having a given diameter, and the loop has another end in the heat sink reeved around another pulley having a diameter greater than said given diameter, with the alloy portion in the second path during said elongation being at a certain tension and the alloy portion in the first path being at a tension greater than said certain tension whereby the resultant of the moment forces applied by the wires in the two paths acts on the pulleys to rotate the larger diameter pulley in a direction which moves the wire from the large diameter pulley along the first path to the small diameter pulley.

4. A method of operating a heat engine which converts thermal energy from a heat source into mechanical energy with an alloy having a shape memory effect wherein the alloy assumes a trained configuration when at a first temperature and the alloy assumes a memory configuration when at a second temperature above said first temperature, including cyclically performing the steps of heating the alloy in the heat source to said second temperature, moving the heated alloy along a first path through a heat regeneration zone toward the heat sink, cooling the alloy in the heat sink to said first temperature, moving the cooled alloy along a second path through said zone in heat exchange relationship with the alloy moving along the first path whereby heat energy is transferred from the heated alloy to the cooled alloy in said zone, and applying movement of the alloy from its trained configuration to its memory configuration as it is heated to act as a force through a distance to produce mechanical work.

5. A method as in claim 4 in which the memory alloy is Nitinol, and the Nitinol is heated in the heat source to a temperature in the range of 70°–80° C and is cooled in the heat sink to a temperature in the range of 5°–10° C.

6. A method as in claim 5 in which the Nitinol is placed under a first tension force as it is moved along the first path while undergoing cooling in the heat regeneration zone whereby the Nitinol elongates, and the Nitinol assumes a second tension force greater than said first force as it is heated during its movement along the second path and contracts to its memory configuration.

7. A method as in claim 6 in which the second tension force is applied against the first tension force to produce a resultant tension force which acts through a distance to produce said mechanical work.

8. A method for starting operation of a heat engine employing a shape memory alloy formed in an endless loop one end of which is reeved in non-slip engagement about a first pulley and the second end of which is reeved in non-slip engagement about a second pulley having a diameter greater than the diameter of the first pulley, the method of starting operation comprising the steps of applying heat to a portion of the wire reeved about the first pulley, extracting heat from a portion of the wire reeved about the second pulley, applying a torque to the pulleys so that they conjointly turn at equal angular rates and in the same rotational direction for moving the loop through at least one complete cycle around the pulleys, progressively applying tension in the loop as the loop continues to cycle about the pulleys, and removing the applied torque when the torque generated by the engine is sufficient to rotate the pulleys.

9. A method for starting a heat engine employing a shape memory alloy which is formed in a loop one end of which is reeved in non-slip engagement about a first pulley and the opposite end of which is reeved in non-slip engagement about a second pulley having a diameter greater than the diameter of the first pulley, including the steps of heating a reach of the loop which extends from the first pulley and causing the alloy of the heated reach to contract towards its memory shape, cooling the opposite reach of the loop which extends from the second pulley and causing the alloy of the cooled reach to elongate towards its trained shape, moving the pulleys apart a distance which applies predetermined tensions in the reaches of the loop, conjointly rotating the pulleys in the same rotational direction for cyclically moving the loop about the pulleys, and varying the angular phase relationship between the pulleys to maintain said predetermined tensions until a steady state operation is reached.

10. A method of operating a heat engine employing a shape memory alloy which is formed in a loop one end of which is reeved in non-slip engagement about a first pulley and the opposite end of which is reeved in non-slip engagement about a second and in which a reach of the loop extending from the first pulley is heated to cause such reach to contract toward its memory shape and the opposite reach of the loop extending from the second pulley is cooled to cause such portion to elongate toward its trained shape, with the differential in tension between the contracting and elongating reaches of the loop applied as a resultant force acting through a distance against a load to produce mechanical power, including the steps of constraining the pulleys to conjointly rotate at a given angular phase relationship which maintains the elongating and contracting reaches of the loop at respective predetermined tensions, and varying the angular phase relationship between the pulleys for maintaining the predetermined tensions in the loop during changes in said load, or during changes in the temperatures of the loop portions being heated or cooled, or during changes in the rate of rotation of the pulleys.

11. A heat engine for converting thermal energy into mechanical work including the combination of a working element composed of a shape memory alloy which assumes a trained shape when cooled below its transition temperature and which assumes a memory shape when heated above its transition temperature, heat source means for heating the element above its transition temperature, heat sink means for cooling the element below its transition temperature, transport means for cyclically moving the element through the heat source, along a first path toward the heat sink, through the heat sink and along a second path back to the heat source, and means for transferring heat energy from portions of the element moving along the first path to portions of the element moving along the second path whereby the element portions in the first path are cooled and elongate under a given tension toward their trained shape and the element portions moving along the second path contract under a second tension greater than the given tension as they are heated.

12. A heat engine as in claim 11 in which the working element comprises a loop formed of the shape memory alloy with a first end of the loop disposed in the heat source and a second end of the loop disposed in the heat sink, and the transport means comprises means for cyclically moving the loop with one reach of the loop extending along the first path and the opposite reach of the loop extending along the second path, and the means for transferring heat includes means for directing the opposite reaches of the loop in close-spaced heat exchange relationship.

13. A heat engine as in claim 12 in which the means for cyclically moving the loop includes a first pulley mounted for rotation within the heat source and a second pulley mounted for rotation within the heat sink, means for constraining the pulleys for conjoint equal angular rotation, and idler pulley means for directing the reach extending between one side of the pulleys in close-spaced heat exchange relationship with and in opposite direction from the reach extending between the opposite side of the pulleys.

14. A heat engine as in claim 13 in which the diameter of the second pulley is greater than the diameter of the first pulley whereby a differential tension between opposite reaches of the loop imparts a resultant torque on the second pulley.

15. A heat engine as in claim 14 in which the diameter of the second pulley is substantially 3% larger than the diameter of the first pulley.

16. A heat engine as in claim 12 in which the means for transferring heat directs the opposite reaches of the loop to move in opposite directions for counterflow heat exchange.

17. A heat engine as in claim 12 in which the means for cyclically moving the loop comprises a first pulley rotatably mounted in the heat source and a second pulley rotatably mounted in the heat sink, means for reeving opposite ends of the loop in non-slip engagement about respective pulleys, and means for constraining the pulleys for conjoint equal angular rotation for maintaining predetermined tensions in respective reaches of the loop.

18. A heat engine as in claim 17 in which the means for constraining the pulleys includes means for selectively changing the angular phase relationship between the pulleys for maintaining predetermined tensions in the loop reaches during start-up of the engine, or for optimizing engine running conditions responsive to changes in conditions such as engine load, pulley speed, and heating and cooling temperatures.

19. A heat engine as in claim 18 in which the means for changing the phase relationship includes gear train means comprising first and second gears mounted for rotation with respective first and second pulleys, and differential drive means including a pair of sun gears interengaged by a pair of planet gears with each sun gear drivingly coupled with a respective first and second gear, a spider mounted for rotation with one of said sun gears for rotatably carrying the planet gears on opposite sides of the sun gear, and means for selectively varying the angular relationship of the spider with respect to said one sun gear for changing said phase relationship.

20. A heat engine as in claim 17 in which the means for reeving the loops about the pulleys includes means forming V-shaped grooves about the circumference of each pulley, and means for frictionally gripping the reeved portion of the loops in the grooves for non-slip engagement therewith.

21. A heat engine as in claim 11 in which the shape memory alloy comprises Nitinol.

22. A heat engine as in claim 11 in which the transport means comprises at least first and second inner pulleys rotatably mounted in the respective heat source and heat sink and at least first and second outer pulleys rotatably mounted in the respective heat source and heat sink adjacent to the corresponding inner pulleys, and the working element comprises at least a first endless loop having its opposite ends reeved about the inner pulleys and at least a second endless loop having its opposite ends reeved about the outer pulleys, and the transport means further includes means for conjointly rotating the inner pulleys for moving the first loop in one direction and means for conjointly rotating the outer pulleys for moving the second loop in a direction counter to the movement of the first loop.

23. A heat engine as in claim 22 in which the reaches of the first loop are disposed in close-spaced heat exchange relationship with the reaches of the second loop.

24. A heat engine as in claim 22 in which the heat source includes reservoir means for directing a hot fluid in heat exchange relationship with portions of the loops which are reeved about the first inner and outer pulleys, the heat sink includes reservoir means for directing cold fluid in heat exchange relationship with portions of the loops which are reeved about the second inner and outer pulleys, and seal means formed about the loops at the points of exit of the loops from the respective reservoir means for preventing escape of the hot and cold fluids while permitting movement of the loops into and out of the reservoirs.

25. A heat engine as in claim 24 in which the means for transferring heat includes means forming a pair of heat regeneration chambers about the reaches of the loop and between the respective reservoir means, and a heat exchange fluid in the chambers for transferring heat between the portions of the loops contained therein.

* * * * *

UNITED STATES PATENT AND TRADEMARK OFFICE
CERTIFICATE OF CORRECTION

PATENT NO. : 4,055,955
DATED : November 1, 1977
INVENTOR(S) : A. David Johnson

It is certified that error appears in the above-identified patent and that said Letters Patent are hereby corrected as shown below:

In the heading on page 1 the name of the inventor is corrected to:

— Alfred David Johnson —

In the specification, column 1, insert the following paragraph after line 11:

— The Government has rights in this invention pursuant to Contract No. W-7405-ENG-48, awarded by the U.S. Department of Energy —

In the specification column 6, lines 16, 19, 36 and 38, insert the integration symbols — $\int$ — in the formulas.

Signed and Sealed this

Twenty-first Day of April 1981

[SEAL]

Attest:

RENE D. TEGTMEYER

Attesting Officer    Acting Commissioner of Patents and Trademarks